3,320,416
PROCESS OF DETECTING THE RELATIVE ELONGATION OF TWO FILAMENTS BY STIMULATED EMISSION OF SECONDARY RADIATION
Stephen F. Skala, Chicago, Ill., assignor to Western Electric Company, Incorporated, New York, N.Y., a corporation of New York
Filed Mar. 24, 1964, Ser. No. 354,271
2 Claims. (Cl. 250—51.5)

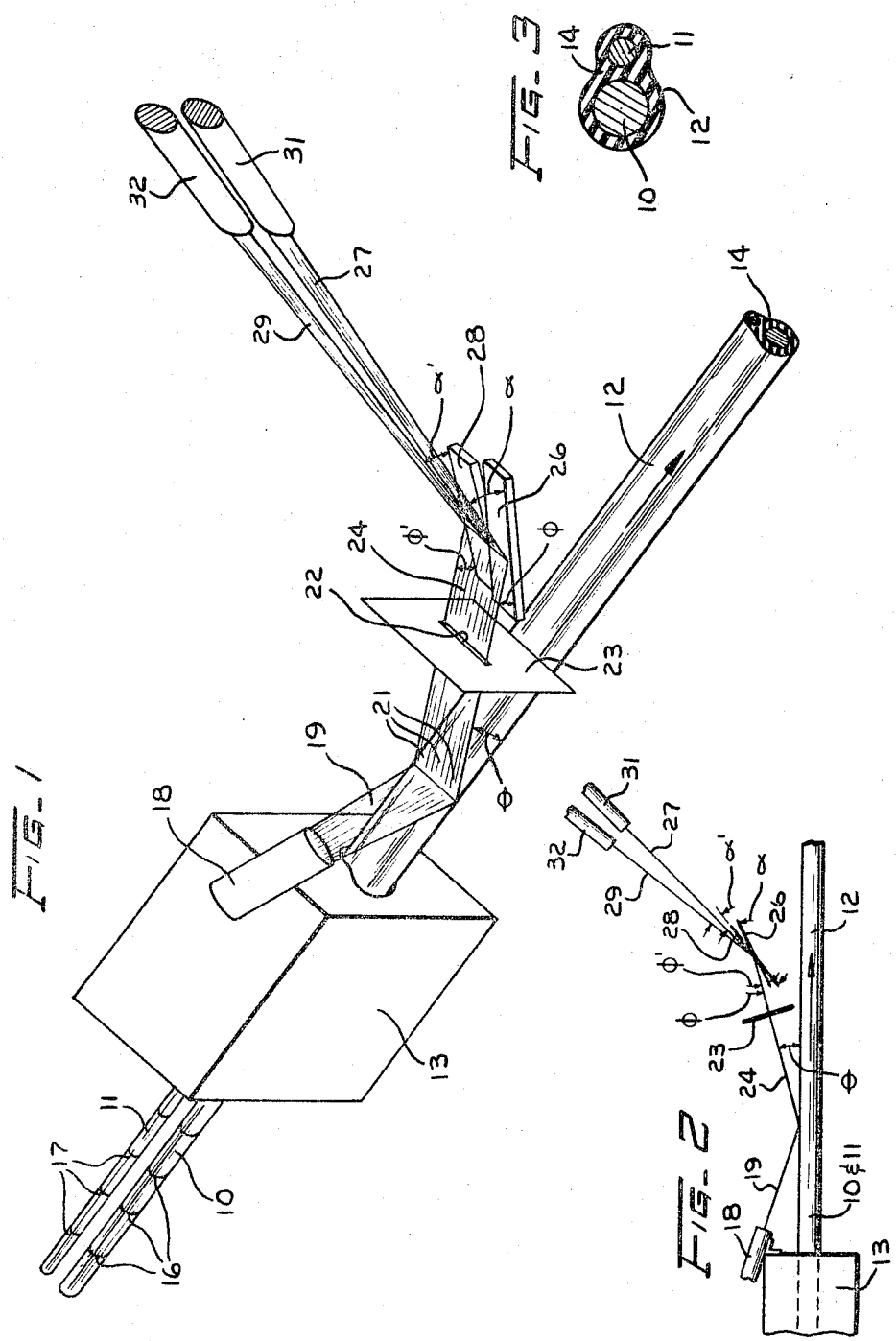

The present invention relates generally to methods employing excited emission of secondary radiation to locate a particular point concealed within an object, and more particularly to methods employing such technique to detect relative elongation of a pair of filaments enclosed in a common covering member. The general objects of the invention are to provide new and improved methods of such character.

A major problem confronting industry today is the measurement of displacements and positions of points or components in an object wherein portions of the object conceal or obstruct access to the points or components so that the normal direct measurements cannot be made. Such measurements are particularly important, for example, where prescribed arrangements of interior components are to be maintained during fabrication of a product. A further example consists in the continued maintenance of certain arrangements of interior components under the varying conditions of the use of the product for its intended purpose. Expansion or other change in a single internal element may also be of significance.

It is a feature of the present invention to accomplish such measurements by utilizing a known characteristic that any element in the periodic table will emit secondary radiation at a characteristic wave length when excited by radiation above a certain energy level. More specifically, any point within an object may be marked with an element in a suitable chemical form during fabrication, and in response to exciting radiation that marking will emit characteristic secondary radiation which may be detected to determine the position or displacement of that point.

A particularly acute problem in the cable-making industry involves the relative tensions and elongations of a plurality of core filaments being formed into a unitary cable. Unequal tensions, for example, applied to the core members during the forming operation results in unequal elongations of the core members. Consequently, when such tensions are removed from the finished cable, the core members tend to contract to their normal states, and because of the unequal elongations thereof, the core members tend to move relative to one another, causing the cable to twist or coil and rendering it defective.

Therefore, more specific objects of the invention include the provision of new and improved processes wherein the above technique of radiation excitation of characteristic secondary radiation is employed to determine relative displacement or elongation of core members under tension and being formed into a unitary cable with an extruded covering material which prevents direct measurement.

It is another object of the present invention to provide methods of such character, wherein markings are arranged in a prescribed fashion on a component core element during the fabrication of the cable, which markings are composed of materials normally dormant so as not to emit harmful radiation without stimulation by a particular kind of primary radiation, and which markings have a potentially infinite life during which the materials thereof will respond to primary radiation to emit detectable secondary radiation of a characteristic wave length, so that not only during the fabrication of the cable but at any time thereafter the relative elongation of the core elements may be observed, the fault located, and that portion of the cable repaired, or scrapped for recovery of the raw materials.

Additional objects of the invention are to provide methods as set forth in the preceding object, wherein simple markings, each identifiable by secondary radiation of a characteristic wave length, may be easily applied to the individual core filaments prior to the fabrication of the cable; wherein the marking materials may be excited, and the secondary radiation emitted thereby readily detected, immediately upon exit of the completed cable from the extruder and without hazard to operating personnel in the general vicinity; and wherein the detected relative positions of the markings on the separate cores provide an instantaneous indication of disparity in the elongations and tensions of the cores, which may be immediately utilized either manually or automatically to adjust the tension on the appropriate core to compensate for any such disparity.

The above and other objects are accompilahed in accordance with the invention by marking, during the fabrication of an object, a point concealed within the object with a material which in response to primary radiation emits characteristic secondary radiation of sufficient energy to penetrate portions of the object concealing the marked point. It may be desired simply to locate the marked point, or to relate it to a fixed reference so that displacement thereof may be measured. The completed object may then be exposed to radiation of sufficient energy to penetrate to the inaccessible point and to cause the marking to emit secondary radiation, and the secondary radiation thus emitted detected in such a manner as to ascertain the instantaneous position of the marking or to relate it to the point of reference.

In accordance with the preferred embodiment of the invention the relative elongation of two filaments enclosed in a common covering member in spaced parallel relationship may be detected. In this case, markings provided on each of the filaments are aligned with the corresponding markings on the other prior to the application of tensions on the filaments during the covering operation. The markings on each filament are composed of a dissimilar material so that upon excitation, the marking material emits characteristic secondary radiation of a wave length peculiar to that material to render the markings on the one filament distinguishable from the markings on the other. The secondary radiation emitted by the markings may thus be detected after the covering operation to determine whether the aligned relationship of the markings has been maintained, and hence to determine elongation of one filament relative to the other as the result of unequal tensions.

Other aspects, advantages, and objects of the invention will become apparent from the following detailed description of a specific embodiment thereof when taken in conjunction with the appended drawings in which:

FIG. 1 is a diagrammatic, perspective view of apparatus embodying the invention in a preferred form;

FIG. 2 is a diagrammatic side elevational view of the apparatus depicted in FIG. 1; and FIG. 3 is a cross-section of a completed cable operated upon by the apparatus of FIGS. 1 and 2, showing the relative positions of two core filaments which are molded into a unitary cable.

The new basis of measurement afforded by the present invention is a significant advance in radiation measuring techniques. It is known, for example, that one or more radiation detection devices and radioactive source materials may be used for gauging and sorting products during production. But the measurements provided by prior techniques are confined to parameters based upon overall dimensions or density. As an illustration, penetrating rays such as gamma, beta and X-rays are commonly employed for the purpose of gauging thickness or width of moving materials, utilizing common transmission-type (radioactive source on one side and detector on the other side) techniques. Further, coating thickness has been measured with reflective or scattering techniques in which the source and detector also are necessarily exterior to the product.

Such prior techniques cannot however pinpoint an element or point enclosed in an object and isolate its peculiar change or displacement from that of the remainder of the object during varying conditions. The reason for this is that it is impossible with any of the prior techniques for a beam of penetrating radiation to take on distinguishable intelligence relating solely or even distinguishably to an isolated point within the object penetrated. The present invention resolves this problem by placing a virtual source at the point to be observed and by selectively energizing such virtual source to emit radiation carrying intelligence relating solely or at least distinguishably to that isolated point.

The principles governing the behavior of penetrating rays are well known, hence a cursory treatment will suffice to explain the present invention and its adaptation to solve the above-described problems. While the following remarks will be directed to X-rays, other penetrating rays such as gamma rays, neutron bombardment, or beta rays, as from an isotope source, for example, may be employed in the place of X-rays. Since the embodiment of the present invention employs both the principles of secondary X-ray emission and of diffraction (including X-ray spectrometry), the following remarks relative to each phenomenon may aid in the understanding of those principles.

X-rays, as produced in an ordinary X-ray tube, are of various wave lengths (energies) and intensities, and differ in these characteristics based upon the degree of tube vacuum, the target material, and the generating potential between target and cathode. Such rays, generated by high energy electron impingement on target material in a vacuum, may be used for irradiation of elements, particularly the metals, to excite those elements to produce emitted or "secondary" X-rays which with a few exceptions are identical with, but lower in intensity than, characteristic X-radiation produced when the same element is used as the target in an X-ray tube. The production of such rays is variously termed "emission," "secondary radiation," and "fluorescence," but will herein be termed "secondary radiation." Each element thus excited has a characteristic energy wavelength by which the element can be identified with known means of detection.

X-rays are diffractable by crystals, and that principle is employed in the known X-rays diffraction and spectroscopic techniques. In diffraction by a crystal, a monochromatic X-ray beam is reflected by a cleavage face (or by any other atomic plane) of a crystal according to the ordinary laws of optical reflection, i.e. the incident and reflected beams are in the same plane (perpendicular to the reflecting face) and the angles between those beams and the reflecting face are equal.

In addition to those laws, the following condition must be fulfilled if reflection is to occur:

$$N\lambda = 2d \sin \phi \text{ (Bragg's law)}$$

where $\lambda$ is the wave length of the monochromatic radiation, $d$ is the distance of the two adjacent atomic layers parallel to the reflecting plane, $\phi$ is the angle between the incident beam and the plane, and N indicates an "order" of the reflection in terms of an integer. It follows that different monochromatic rays from a source of polychromatic X-rays will be reflected by a crystal at different angles, hence by limitation of the effective operating angles between source (marking in this case), crystal, and ray detector, it is possible to select for detection only such rays as have reflection characteristics which fall between those angles to provide the characteristic X-ray spectrum of the source.

Referring now to the drawings and more particularly to FIG. 1, the illustrated application of the invention involves the detection of relative elongation between a pair of core filaments 10 and 11 which are molded into a single cable 12 by a molding apparatus 13 such that the core filaments 10 and 11 are parallel and spaced apart in the finished cable 12, as shown in FIG. 3. The two core filaments 10 and 11 are unwound from separate supply spools (not shown) with resulting non-uniformity in the tensions applied to the filaments as they are drawn through the molding apparatus and elongation of one core filament relative to the other. Where such a condition exists, it is apparent that when the separate tensions are removed from the core filaments 10 and 11, the relatively elongated one will tend to contract more than the other with respect to the covering material 14, and thus cause coiling or twisting of the completed cable 12.

Since other factors such as the relative size and ductility of the core filaments are involved, it is not sufficient to measure the tensions exerted on the separate core filaments, but rather it is necessary to measure the parameter which is the crux of the problem, namely, change in the relative lengths of the core filaments 10 and 11 under the varying tesnions exerted thereon as they are drawn through the molding apparatus 13. To this end, equally spaced markings 16 and 17 are arranged on the core filaments 10 and 11, respectively, such that as the core filaments are coated with rubber, for example, and molded into a unitary cable in the molding apparatus 13, the markings 16 and 17 on the cores will be aligned if, and only if, the initial relative lengths of the core filaments remain unchanged, i.e., no elognation of one relative to the other.

Broadly, the technique to be employed in determining relative elongation of the core filaments 10 and 11 and utilizing the markings 16 and 17, involves the use of primary radiation directed onto the completed cable as it exits from the molding apparatus to excite the material composing the markings to emit secondary radiation of sufficient energy to penetrate the rubber coating 14 and be detected. At least one of the primary and secondary radiation is limited in effective passage to a defined path so that the source of secondary radiation may be located.

While any element on the periodic table emits secondary radiation in response to certain kinds of primary radiation, the requirement that the markings emit secondary radiation of sufficient energ to penetrate a covering material, such as the rubber layer 14, invokes a limit as to which elements may be utilized in the present application. Elements which have a high atomic number, such as cadmium or barium, can be successfully utilized in the present example in order to satisfy the energy requirement of such secondary radiation.

A further requirement lies in the fact that the markings 16 on one core filament 10 must be distinguishable from the markings 17 on the other core filament 11. To satisfy this requirement, the markings 16 on the core filament 10 are composed of one element, such as barium, and the markings 17 on the core filament 11 are composed of a dissimilar element, such as cadmium. The distinguishing criteria thus established stems from the phenomenon that dissimilar materials emit characteristic secondary radiation of different wave lengths.

To put into practice the above technique, a conventional source 18 of X-rays arranged to provide a thin collimated beam 19 of X-rays is mounted near the exit end of molding apparatus 13 so that the beam 19 is directed angularly onto the completed cable 12 as it emerges from the molding apparatus 13. The X-rays comprising the beam 19 must be of sufficient energy to penetrate the rubber coating 14 to the markings 16 and 17 with sufficient intensity to cause emission of secondary radiation therefrom. Thus, when a marking 16 or 17 on the respective core filament 10 or 11 enters the beam of X-rays, the electrons in the atoms of the element constituting the marking are excited such that characteristic secondary X-rays are emitted in all directions.

The phenomenon that takes place involves quantum mechanics and Bohr's theory of the atom, which states that the electrons exist in shells of particular energy levels, a K shell of lowest energy level and L, M and N shells of progressively higher energy levels. A beam of penetrative radiation impinging on an element excites the atoms of that element such that an electron is ejected from the K shell of an atom for an exciting photon of a particular energy interacting with the element. In the process of ejecting such an electron, the photon often gives up all of its energy to the ejected electron with the result that the electron is given an energy equivalent to that of the photon minus the binding energy of the electron. In filling the hole vacated in the K shell by the ejected electron, an electron from one of the higher energy shells, the L, M or N shell, jumps into the lower energy K shell, and in so doing creates energy in the form of a photon of characteristic secondary radiation.

Characteristic secondary X-rays 21 emitted by the markings 16 and 17 at a particular angle, designated as $\theta$ in FIGS. 1 and 2, are selected from secondary X-rays emitted in all directions by providing a slit 22 in a shield 23. The effect of the slit 22 is to provide a collimated beam 24 of characteristic secondary X-rays 21 emitted by both materials of markings 16 and 17.

A first diffraction crystal 26 is angularly disposed so as to intercept approximately one-half of the collimated beam 24 of characteristic secondary radiation emitted by the markings 16 and 17. The angular disposition of the diffraction crystal 26 requires delicate adjustment in accordance with the previously-mentioned Bragg's law of reflection ($N\lambda = 2d \sin \phi$) so that the angle of incidence $\phi$ of the collimated beam 24 with respect to the crystal 26 and the distance $d$ between two adjacent atomic layers parallel to the reflecting plane of the crystal 26, when substituted into the expression $2d \sin \phi$ results in an integral number N of the corresponding wave length $\lambda$ characteristic of the secondary radiation emitted by the material of the markings 16. With such an angular disposition, Bragg reflection is effected and the characteristic secondary X-rays emitted by the marking material are broken down into their diffraction pattern or line spectrum. A part of this diffraction pattern or line spectrum is selected as a reflected beam 27 at an angle $\alpha$ relative to the crystal 26, $\alpha$ being equal to $\phi$.

Likewise, a second diffraction crystal 28 is angularly disposed so as to intercept the remaining half of the collimated beam 24. The second crystal 28 is so angularly disposed that the angle of incidence $\phi'$ ($\phi' \neq \phi$) satisfies Bragg's law for the wave length $\lambda'$ characteristic of the secondary radiation emitted by the material of the markings 17. Again Bragg reflection is effected and the diffraction pattern or line spectrum for the characteristic secondary radiation of the marking material is a reflected beam 29 at an angle $\alpha'$ relative to the crystal 28, $\alpha'$ being equal to $\phi'$.

Thus, the characteristic secondary radiations indicative of markings 16 and 17, respectively, are distinguished by the different angles of Bragg reflection for secondary radiation of different wave lengths emanating from dissimilar materials. It is important to note that under Bragg's law, only those rays having the proper wave length for the respective crystal will be reflected for the Bragg angle $\phi$ or $\phi'$, and then only at the angle $\alpha$ or $\alpha'$; therefore, extremely high resolution of each is obtained. In other words, only radiation of wave length $\lambda$ (indicative of the markings 16) will be reflected by the crystal 26 at the angle $\alpha$, and only radiation of wave length $\lambda'$ (indicative of the markings 17) will be reflected by the crystal 28 at the angle $\alpha'$.

Hence, a pair of detectors 31 and 32, disposed at the proper angles of reflection $\alpha$ and $\alpha'$, respectively, may each intercept the corresponding reflected beam 27 or 29. Any suitable radiation detectors may be used—scintillation detectors, ionization chambers, or geiger tubes—which will produce a signal indicating that secondary emission has occurred.

A separate detector thus being used to detect characteristic secondary radiation for the respective markings 16 and 17, a comparison of the signals produced by the separate detectors provides an indication of the relationship of the markings 16 and 17. If characteristic secondary X-rays are emitted by the materials of markings 16 and 17 concurrently, the signals received from each detector will be concurrent in time, indicating that the markings 16 and 17 are aligned and that core filaments 10 and 11, respectively, have not changed in relative positions under the varying tensions provided thereon.

While the invention is advantageously adapted to the above-described embodiment, it indeed has many other applications which will now be apparent to those skilled in the art. For example, where it is simply desired to locate a particular point concealed within an object, a marking may be provided at that point during the fabrication of the object. Thus, when stimulated by primary radiation, detectable secondary radiation will be emitted by the marking indicative of its instantaneous position. This may be utilized directly to locate the point or it may be compared with any suitable reference to determine any change in the position of the marked point. Further, a reference point may be established exterior to the object, or a second marking provided within the object, for a direct indication of any change from a known initial relationship between the point of reference and the marking.

It is to be noted that detection of the secondary radiation of itself will not be sufficient to locate the marked point in an irradiated object. The irradiation or detection must be limited in some respect to identify the location of the marked point. For example, the primary radiation may be collimated into a thin beam covering a very small area or point on the object, and the object moved relative to the beam until secondary emission occurs, indicating that the marked point lies within the small area or is coincident with the point of irradiation. On the other hand, the detector and a collimating slit may be arranged so that only secondary radiation emanating from a prescribed point on the object and at a selected angle will be detected. In the latter case, the entire object may be irradiated and the object moved relative to the prescribed point until the marked point becomes coincident therewith, and at such time only will secondary radiation be detected. Thus, by limiting at least one of the primary and secondary radiations to a defined path, detection of the secondary radiation is indicative of the presence of the mark at a point within the object along that defined path.

Thus, while one specific embodiment is described in detail hereinabove, various modifications may be made without departing from the spirit and the scope of the invention, and all modifications within the broad scope of the invention are intended to be included therein.

What is claimed is:

1. A method of detecting the relative elongation of two filaments which are enclosed in a common covering member with the filaments arranged in spaced parallel relationship therewithin, comprising the steps of:

arranging a plurality of equally spaced markings of a dissimilar material on each of the filaments prior to the enclosure thereof within the covering member so that each marking on the associated filament is aligned with a corresponding marking on the other filament, said dissimilar materials each being responsive to penetrative radiation to emit characteristic secondary radiation of sufficient energy to penetrate the covering member and of sufficient disparity in wave length from that of the other material to render the markings on one of the filaments distinguishable from the markings on the other;

directing a collimated beam of penetrating radiation onto the covering member, the radiation being of sufficient energy to penetrate therethrough to the markings;

detecting the characteristic secondary radiation emitted by the markings to detemine whether the aligned relationship has been maintained during the covering operation, hence to determine any elongation of one filament relative to the other.

2. A method of detecting the relative elongation of two filaments as defined in claim 1 wherein said two dissimilar materials for marking the filaments are cadmium and barium, and wherein that portion of the diffracted beam of secondary radiation emitted by each filament marking is detected by a separate detector.

References Cited by the Examiner
UNITED STATES PATENTS

| | | | |
|---|---|---|---|
| 2,786,146 | 3/1957 | Pages | 250—106 |
| 2,901,629 | 8/1959 | Friedman | 250—51.5 |
| 2,957,079 | 10/1960 | Edholm | 250—53 |
| 3,197,638 | 7/1965 | Sinclair | 250—51.5 |

References Cited by the Applicant
UNITED STATES PATENTS

| | | |
|---|---|---|
| Re. 22,531 | 8/1944 | Hare. |
| 2,853,618 | 9/1958 | De Marco et al. |

RALPH G. NILSON, *Primary Examiner.*

WALTER STOLWEIN, *Examiner.*

A. L. BIRCH, *Assistant Examiner.*